(12) United States Patent
Ishino et al.

(10) Patent No.: US 9,907,726 B2
(45) Date of Patent: Mar. 6, 2018

(54) INJECTION BAG AND INJECTION PREPARATION ASSEMBLY

(71) Applicants: Kewpie Kabushiki Kaisha, Tokyo (JP); Baxter International Incorporated, Deerfield, IL (US)

(72) Inventors: Yoshikazu Ishino, Tokyo (JP); Zenichiro Kai, Tokyo (JP); Koji Sueyoshi, Miyazaki-ken (JP); Ken Watanabe, Tokyo (JP)

(73) Assignees: Kewpie Kabushiki Kaisha, Tokyo (JP); Baxter International Inc., Deerfield, IL (US)

( * ) Notice: Subject to any disclaimer, the term of this patent is extended or adjusted under 35 U.S.C. 154(b) by 0 days.

(21) Appl. No.: 14/896,283

(22) PCT Filed: Apr. 3, 2014

(86) PCT No.: PCT/JP2014/059887
§ 371 (c)(1),
(2) Date: Dec. 4, 2015

(87) PCT Pub. No.: WO2015/151264
PCT Pub. Date: Oct. 8, 2015

(65) Prior Publication Data
US 2017/0027816 A1 Feb. 2, 2017

(51) Int. Cl.
*A61B 19/00* (2006.01)
*A61J 1/14* (2006.01)
(Continued)

(52) U.S. Cl.
CPC ............... *A61J 1/1468* (2015.05); *A61J 1/10* (2013.01); *B32B 1/02* (2013.01); *B32B 7/02* (2013.01);
(Continued)

(58) Field of Classification Search
CPC .. A61J 1/1468; A61J 1/10; B32B 1/02; B32B 7/02; B32B 7/12; B32B 27/08;
(Continued)

(56) References Cited

U.S. PATENT DOCUMENTS

| 4,210,686 A | 7/1980 | Gajewski et al. |
| 4,322,465 A | 3/1982 | Webster |

(Continued)

FOREIGN PATENT DOCUMENTS

| CN | 102837475 | 12/2012 |
| CN | 102848675 | 1/2013 |

(Continued)

OTHER PUBLICATIONS

Search Report issued in corresponding European Patent Application No. 14888268.1 dated Aug. 4, 2017. 8 pages.
(Continued)

*Primary Examiner* — Philip R Wiest
(74) *Attorney, Agent, or Firm* — K&L Gates LLP (57) ABSTRACT

An injection bag is formed of a multilayer film, and includes an intermediate layer that includes a mixture of 60 to 90 mass % of a crystalline polyamide resin and 10 to 40 mass % of a noncrystalline polyamide resin. The crystalline polyamide resin has a combined content of a monomer and a low-molecular-weight polymer of 0.8 mass % or less. The noncrystalline polyamide resin includes a semi-aromatic polyamide.

20 Claims, 2 Drawing Sheets

(51) Int. Cl.
    *A61J 1/10* (2006.01)
    *B32B 27/08* (2006.01)
    *B32B 27/32* (2006.01)
    *B32B 27/34* (2006.01)
    *B32B 1/02* (2006.01)
    *B32B 7/12* (2006.01)
    *B32B 7/02* (2006.01)
    *B32B 27/28* (2006.01)

(52) U.S. Cl.
    CPC .............. *B32B 7/12* (2013.01); *B32B 27/08* (2013.01); *B32B 27/28* (2013.01); *B32B 27/32* (2013.01); *B32B 27/34* (2013.01); *B32B 2250/03* (2013.01); *B32B 2250/05* (2013.01); *B32B 2250/40* (2013.01); *B32B 2255/10* (2013.01); *B32B 2307/40* (2013.01); *B32B 2307/412* (2013.01); *B32B 2307/51* (2013.01); *B32B 2307/546* (2013.01); *B32B 2307/702* (2013.01); *B32B 2307/704* (2013.01); *B32B 2307/71* (2013.01); *B32B 2307/7242* (2013.01); *B32B 2307/7265* (2013.01); *B32B 2439/46* (2013.01); *B32B 2439/80* (2013.01)

(58) Field of Classification Search
    CPC ......... B32B 27/28; B32B 27/32; B32B 27/34; B32B 2250/03; B32B 2250/05; B32B 2250/40; B32B 2255/10; B32B 2307/40; B32B 2307/412; B32B 2307/51; B32B 2307/546; B32B 2307/702; B32B 2307/704; B32B 2307/71; B32B 2307/7242; B32B 2307/7265
    USPC .................................................. 604/403–416
    See application file for complete search history.

(56) References Cited

U.S. PATENT DOCUMENTS

| | | | |
|---|---|---|---|
| 4,686,125 A | 8/1987 | Johnston et al. | |
| 4,692,361 A | 9/1987 | Johnston et al. | |
| 4,707,389 A | 11/1987 | Ward | |
| 4,778,697 A | 10/1988 | Genske et al. | |
| 4,828,892 A | 5/1989 | Kersten et al. | |
| 4,892,604 A | 1/1990 | Measells et al. | |
| 5,066,290 A | 11/1991 | Measells et al. | |
| 5,356,709 A | 10/1994 | Woo et al. | |
| 5,529,821 A | 6/1996 | Ishikawa et al. | |
| 5,741,566 A | 4/1998 | Hogstrom et al. | |
| 5,993,949 A | 11/1999 | Rosenbaum et al. | |
| 5,998,019 A | 12/1999 | Rosenbaum et al. | |
| 6,027,776 A | 2/2000 | Mueller | |
| 6,083,587 A | 7/2000 | Smith et al. | |
| 6,261,655 B1 | 7/2001 | Rosenbaum et al. | |
| 6,297,046 B1 | 10/2001 | Smith et al. | |
| 6,361,843 B1 | 3/2002 | Smith et al. | |
| 6,500,559 B2 | 12/2002 | Hofmeister et al. | |
| 6,579,621 B1 | 6/2003 | Shah | |
| 6,713,165 B1 | 3/2004 | Karsten | |
| 6,743,523 B1 | 6/2004 | Woo et al. | |
| 6,797,398 B2 | 9/2004 | Suzuki et al. | |
| 6,964,798 B2 | 11/2005 | Nebgen et al. | |
| 7,678,097 B1 | 3/2010 | Peluso et al. | |
| 8,075,544 B2 | 12/2011 | Peluso et al. | |
| 9,004,761 B2 | 4/2015 | Balteau et al. | |
| 2007/0144923 A1 | 6/2007 | Houwaert et al. | |
| 2010/0080985 A1 | 4/2010 | Noda et al. | |
| 2010/0133278 A1 | 6/2010 | Peluso et al. | |
| 2010/0247935 A1 | 9/2010 | Chang et al. | |
| 2010/0247936 A1 | 9/2010 | Chang et al. | |
| 2010/0256590 A1* | 10/2010 | Babrowicz ............... | B32B 7/12 604/408 |
| 2012/0215196 A1 | 8/2012 | Kobayashi | |

FOREIGN PATENT DOCUMENTS

| | | |
|---|---|---|
| EP | 0686092 | 12/1995 |
| JP | H06-070971 | 3/1994 |
| JP | 2001-328681 | 11/2001 |
| JP | 2002035084 | 2/2002 |
| JP | 2005-527401 | 9/2005 |
| JP | 2006143303 | 6/2006 |
| JP | 2007105134 | 4/2007 |
| WO | WO8602041 | 4/1986 |
| WO | 9515656 | 6/1995 |
| WO | WO0118112 | 3/2001 |
| WO | 03/080333 A1 | 10/2003 |

OTHER PUBLICATIONS

International Search Report dated Jul. 8, 2014 for International Appln. No. PCT/JP2014/059887 (3 pages).

\* cited by examiner

INJECTION BAG AND INJECTION PREPARATION ASSEMBLY

PRIORITY CLAIM

This application is a 371 National Stage Application of International Application No. PCT/JP2014/059887, filed Apr. 3, 2014, the disclosure of which are incorporated by reference herein in their entireties.

TECHNICAL FIELD

The present invention relates to an injection bag that is formed of a multilayer film that exhibits an excellent gas barrier capability, and an injection preparation assembly.

BACKGROUND ART

A pouch (bag) that is formed of a film produced using a flexible material such as polyvinyl chloride, polyethylene, or polypropylene has been known as an injection container. A pouch allows easy drainage of a fluid contained therein at atmospheric pressure, and is highly safe due to flexibility. Therefore, a pouch has been generally used as an infusion container. A multilayer film that forms a pouch is required to exhibit excellent flexibility, transparency, heat resistance, hygienic properties, mechanical strength, gas barrier capability, workability, and the like from the viewpoint of a material.

In recent years, a reduction in the amount of waste has been desired to deal with environmental issues and hospital issues, and a reduction in volume has been required for medical containers. Therefore, an injection bag that meets the above quality requirements, and can be disposed of in a non-bulky manner has been desired.

Soft polyvinyl chloride to which a plasticizer is added has been used as a material for forming a pouch. Soft polyvinyl chloride exhibits excellent flexibility, heat resistance, transparency, workability, gas barrier capability, and the like. However, a plasticizer, a stabilizer, a residual monomer, and the like included in polyvinyl chloride may be eluted into a fluid contained in a pouch, and it has been pointed out that dioxine may be produced during incineration after disposal. In order to deal with the above problems, a pouch formed of a polyolefin-based resin instead of polyvinyl chloride has been proposed from the viewpoint of hygienic properties and safety.

However, since a polyolefin-based resin exhibits a poor gas barrier capability, oxygen in air may pass through the pouch, and the drug solution may change in quality. The water vapor pressure that has been saturated inside the pouch normally causes a difference in partial pressure of nitrogen and partial pressure of oxygen between the inside and the outside of the pouch. When using a pouch formed of a polyolefin-based resin that exhibits a poor gas barrier capability, the volume inside the pouch may increase due to the differential pressure (osmotic pressure), and the drainage capability and the like may deteriorate due to expansion of the pouch. It is known that the burden imposed on the body can be reduced by adjusting the pH of an injection or a peritoneal dialysis fluid using bicarbonate ions that are normally present in the body. However, since a polyolefin-based resin exhibits a poor gas barrier capability, carbonic acid is removed during heat sterilization at a temperature of more than 100° C.

As a pouch-forming material that may solve the above problems, an infusion bag formed of a four-layer multilayer film consisting of polyolefin-based resin layer/adhesive resin layer/polyamide layer/low-water-permeable resin layer (where "/" indicates the boundary between two layers (hereinafter the same)) has been proposed (see JP-A-60-55958, for example). An injection bag formed of a multilayer film in which a polyamide resin is used for an intermediate layer has also been proposed (see JP-A-2002-35084, for example).

However, an injection bag has not been known that exhibits a practical gas barrier capability, and meets the maximum UV absorbance standard of the Test Methods for Plastic Containers (elution test) specified in the Japanese Pharmacopoeia. This is because a water-soluble monomer such as epsilon-caprolactam and a water-soluble low-molecular-weight polymer are eluted from the polyamide resin used for the intermediate layer or the like of the multilayer film. When the thickness of the polyamide resin layer is increased to achieve a practical barrier capability, a large amount of monomer and low-molecular-weight polymer is eluted into the fluid contained in the injection bag, and the maximum UV absorbance measured by the Test Methods for Plastic Containers specified in the Japanese Pharmacopoeia exceeds 0.08.

SUMMARY OF INVENTION

Technical Problem

The invention was conceived in view of the above situation. An object of the invention is to provide an injection bag that is formed of a multilayer film that exhibits an excellent gas barrier capability due to the use of a polyamide resin for an intermediate layer, and meets the standard of the Test Methods for Plastic Containers (elution test) specified in the Japanese Pharmacopoeia, and an injection preparation assembly using the same.

Solution to Problem

The inventors of the invention conducted extensive studies in order to achieve the above object, and completed the invention.

According to one aspect of the invention, there is provided an injection bag that is formed of a multilayer film, and includes:

an innermost layer that is formed of a polypropylene-based resin;

an outermost layer that is formed of a polypropylene-based resin;

an intermediate layer that is situated between the innermost layer and the outermost layer; and two adhesive layers that are situated on either side of the intermediate layer, the intermediate layer including a mixture of 60 to 90 mass % of a crystalline polyamide resin and 10 to 40 mass % of a noncrystalline polyamide resin, the crystalline polyamide resin having a combined content of a monomer and a low-molecular-weight polymer of 0.8 mass % or less, the noncrystalline polyamide resin including a semi-aromatic polyamide, and the injection bag having a maximum UV absorbance measured in accordance with the Test Methods for Plastic Containers specified in the Japanese Pharmacopoeia 16th Edition of 0.08 or less.

In the injection bag, the polypropylene-based resin of at least one of the outermost layer and the innermost layer may contain a polyolefin-based resin other than the polypropylene-based resin.

In the injection bag, the polypropylene-based resin may have a flexural modulus of 300 to 700 MPa.

In the injection bag, the polypropylene-based resin may contain a polyolefin-based elastomer.

In the injection bag, the intermediate layer may include a mixture of 65 to 80 mass % of the crystalline polyamide resin and 20 to 35 mass % of the noncrystalline polyamide resin.

In the injection bag, the intermediate layer may have a thickness of 20 to 42 micrometers.

In the injection bag, the crystalline polyamide resin may be a polyamide 6-66 copolymer.

In the injection bag, the noncrystalline polyamide resin may be an isophthalic acid/terephthalic acid/hexamethylenediamine polycondensate.

According to another aspect of the invention, there is provided an injection preparation assembly that includes the above injection bag, and a drug solution that is contained in the injection bag.

Advantageous Effects of Invention

The injection bag according to one aspect of the invention that is formed of the multilayer film exhibits a practical barrier capability due to the use of the polyamide resin for the intermediate layer, and meets the maximum UV absorbance standard of the Test Methods for Plastic Containers specified in the Japanese Pharmacopoeia 16th Edition.

DESCRIPTION OF EMBODIMENTS

Exemplary embodiments of the invention are described in detail below. The following exemplary embodiments illustrate examples of the invention. Note that the invention is not limited to the following exemplary embodiments. The invention includes various modifications that may be implemented without departing from the scope of the invention. Note also that all of the elements described below in connection with the following exemplary embodiments should not be necessarily taken as essential elements of the invention.

An injection bag according to one embodiment of the invention is formed of a multilayer film, and includes an innermost layer that is formed of a polypropylene-based resin; an outermost layer that is formed of a polypropylene-based resin; an intermediate layer that is situated between the innermost layer and the outermost layer; and two adhesive layers that are situated on either side of the intermediate layer, the intermediate layer including a mixture of 60 to 90 mass % of a crystalline polyamide resin and 10 to 40 mass % of a noncrystalline polyamide resin, the crystalline polyamide resin having a combined content of a monomer and a low-molecular-weight polymer of 0.8 mass % or less, the noncrystalline polyamide resin including a semi-aromatic polyamide, and the injection bag having a maximum UV absorbance measured in accordance with the Test Methods for Plastic Containers specified in the Japanese Pharmacopoeia 16th Edition of 0.08 or less.

1. Injection Bag

Figure 1:
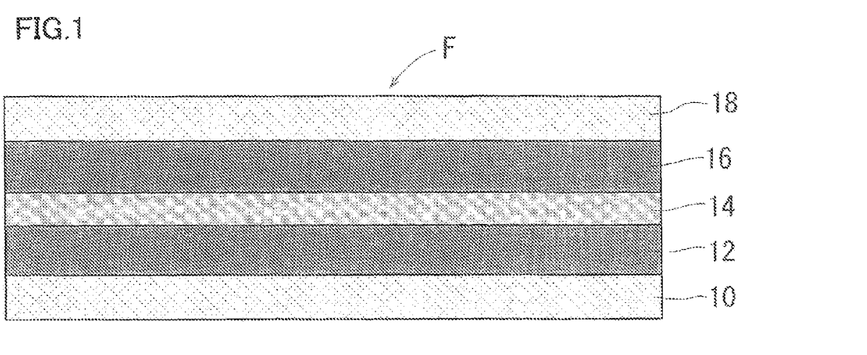
FIG. 1 is a cross-sectional view schematically illustrating a multilayer film according to one embodiment of the invention.

FIG. 1 is a cross-sectional view schematically illustrating the configuration of a multilayer film according to one embodiment of the invention. An injection bag according to one embodiment of the invention includes a multilayer film F that sequentially includes an innermost layer 10, an adhesive layer 12, an intermediate layer 14, an adhesive layer 16, and an outermost layer 18. The innermost layer 10 forms an inner wall surface that comes in contact with a solution contained in the injection bag. The outermost layer 18 forms the outer wall surface of the injection bag.

1.1. Innermost Layer and Outermost Layer

The innermost layer 10 and the outermost layer 18 according to one embodiment of the invention are formed of a polypropylene-based resin that includes propylene as the main component.

1.1.1. Polypropylene-Based Resin

Examples of the polypropylene-based resin include a propylene homopolymer, a propylene copolymer, a polypropylene-based thermoplastic elastomer, and a mixture thereof. The content of propylene in the polypropylene-based resin may be 50% or more on molar basis. The polypropylene-based resin may further contain a polyolefin-based resin other than the polypropylene-based resin within a range in which the whole content of propylene is not less than 50% on molar basis. Examples of the propylene copolymer include a random copolymer or a block copolymer of propylene and ethylene or an alpha-olefin that is copolymerizable with propylene, a block copolymer or a graft copolymer that includes a rubber component, and the like. The alpha-olefin that is copolymerizable with propylene is preferably an alpha-olefin having 4 to 12 carbon atoms. Examples of the alpha-olefin having 4 to 12 carbon atoms include 1-butene, 1-pentene, 1-hexene, 1-heptene, 1-octene, 4-methyl-1-pentene, 1-decene, and the like. These alpha-olefins may be used either alone or in combination. The alpha-olefin is normally used in a ratio of about 1 mass % to about 30 mass % relative to propylene. For example, a copolymer disclosed in JP-A-2001-226435 that is produced by subjecting propylene and an alpha-olefin to multistage polymerization, or the like may be used as the copolymer of propylene and the alpha-olefin. Examples of the polyolefin-based resin other than the polypropylene-based resin include a homopolymer of polyolefin-based resin such as an ethylene homopolymer, a polyolefin copolymer having a propylene content less than 50 mol % such as a copolymer of ethylene and propylene, a polyolefin-based thermoplastic elastomer such as a polyethylene-based thermoplastic elastomer, and a mixture thereof. A compound of such a homopolymer or copolymer and an additional polyolefin or resin may also be used. In particular, a relatively flexible compound that has a flexural modulus of 300 to 700 MPa and is widely used for an injection bag may be used to improve the flexibility of the multilayer film. It is also possible to use polypropylene having a melt flow rate (MFR) of 1 to 10 g/10 min from another point of view.

1.1.2. Polypropylene-Based Resin Used for Innermost Layer

The polypropylene-based resin used for the innermost layer 10 rarely affects the gas barrier capability and prevention of elution of a monomer or a low-molecular-weight polymer from the intermediate layer 14. A polypropylene-based resin widely used for an injection bag may be appropriately selected as the polypropylene-based resin used for the innermost layer 10 from the polypropylene-based resins mentioned above in Section 1.1.1. Examples of such a polypropylene-based resin include a copolymer of propylene and ethylene or an alpha-olefin, a copolymer of propylene, ethylene, and an alpha-olefin, and a compound resin of such a copolymer and a polyolefin-based elastomer or a propylene homopolymer. Examples of a commercially available product of such a copolymer and compound resin include ZELAS (registered trademark) manufactured by Mitsubishi Chemical Corporation. In particular, ZELAS 7023, ZELAS 7025, or ZELAS MC752 that has an MFR of 1 to 4 g/10 mm may be used.

1.1.3. Polypropylene-Based Resin Used for Outermost Layer

The polypropylene-based resin used for the outermost layer 18 rarely affects the gas barrier capability and prevention of elution of a monomer or a low-molecular-weight polymer from the intermediate layer 14. A polypropylene-based resin widely used for an injection bag may be appropriately selected as the polypropylene-based resin used for the outermost layer 18 from the polypropylene-based resins mentioned above in Section 1.1.1. Examples of such a polypropylene-based resin include a copolymer of propylene and ethylene or an alpha-olefin, a copolymer of propylene, ethylene, and an alpha-olefin, and a compound resin of such a copolymer and a polyolefin-based elastomer or a propylene homopolymer. Examples of a commercially available product of such a copolymer and compound resin include ZELAS (registered trademark) manufactured by Mitsubishi Chemical Corporation. In particular, ZELAS 723 or ZELAS MC753 that has a melting peak temperature of 160 to 170° C. may be used.

1.2. Intermediate Layer

The intermediate layer 14 according to one embodiment of the invention includes a mixture of 60 to 90 mass % of a crystalline polyamide resin and 10 to 40 mass % of a noncrystalline polyamide resin. When the ratio of the noncrystalline polyamide resin is 10 mass % or more, the amount of monomer or low-molecular-weight polymer eluted from the multilayer film can be significantly reduced while improving the gas barrier capability of the multilayer film (see FIG. 2 (described later)). It is generally known that a noncrystalline polyamide resin and a crystalline polyamide resin do not have mutual solubility. It is considered that particles of a noncrystalline polyamide resin that are dispersed in a crystalline polyamide resin suppress diffusion of a monomer or a low-molecular-weight polymer included in the crystalline polyamide resin. If the ratio of the noncrystalline polyamide resin exceeds 40 mass %, the intermediate layer may become fragile, and may break when the intermediate layer is bent.

In order to reduce gas permeability at a high temperature and a high humidity, the mixture included in the intermediate layer 14 may be a mixture of 65 to 85 mass % of the crystalline polyamide resin and 20 to 35 mass % of the noncrystalline polyamide resin. When the ratio of the noncrystalline polyamide resin is 35 mass % or less, the multilayer film exhibits moderate flexibility. If the ratio of the noncrystalline polyamide resin is less than 20 mass %, the carbon dioxide permeability of the multilayer film at a high temperature and a high humidity may increase. If the ratio of the noncrystalline polyamide resin is less than 10 mass %, it may be difficult to suppress volatilization of bicarbonate ions during heat sterilization at 121° C. (see FIGS. 3 and 4 (described later)).

1.2.1. Crystalline Polyamide Resin

The crystalline polyamide resin used for the intermediate layer 14 has a combined content of a monomer and a low-molecular-weight polymer of 0.8 mass % or less. Specific examples of the crystalline polyamide resin include a polycaproamide-polyhexamethylene adipamide copolymer (polyamide 6-66), polycaproamide (polyamide 6), polytetraethylene adipamide (polyamide 46), polyhexamethylene adipamide (polyamide 66), polyundecamide (polyamide 11), a polycaproamide-polyundecamide copolymer (polyamide 6-11), polydodecanamide (polyamide 12), a polycaproamide-polydodecanamide copolymer (polyamide 6-12), polyhexamethylene sebacamide (polyamide 610), polyhexamethylene dodecanamide (polyamide 612), polyundecamethylene adipamide (polyamide 116), mixtures thereof, copolymers thereof, and the like. In particular, a polyamide 6-66 copolymer may be used as the crystalline polyamide resin used for the intermediate layer 14. Note that a small amount of an additional crystalline polyamide resin may be mixed with a polyamide 6-66 copolymer as long as the advantageous effects of the invention are not impaired. Such a mixture is considered to be a polyamide 6-66 copolymer.

Polyamide 6 or a polyamide 6-66 copolymer is obtained by polycondensation of 10 to 100 parts by mass of epsilon-caprolactam and 0 to 90 parts by mass of an equimolar salt of adipic acid and hexamethylenediamine (total amount=100 parts by mass). Polyamide 6 is obtained when using only epsilon-caprolactam. The content of repeating units derived from epsilon-caprolactam in polyamide 6 or a polyamide 6-66 copolymer may be 10 to 100 mass %. If the content of repeating units derived from epsilon-caprolactam is too low, the mechanical strength and the formability (moldability) of the polyamide layer tend to deteriorate. The content of repeating units derived from epsilon-caprolactam may be 30 to 100 mass %, or may be 50 to 100 mass %. Polyamide 6 or a polyamide 6-66 copolymer may be terminated with a monocarboxylic acid or a monoamine. For example, polyamide 6 or a polyamide 6-66 copolymer may be terminated with a monocarboxylic acid or a monoamine having 2 to 22 carbon atoms.

The relative viscosity of the crystalline polyamide resin is not particularly limited. The relative viscosity of the crystalline polyamide resin measured in 96 mass % concentrated sulfuric acid at a concentration of 1% and a temperature of 25° C. in accordance with JIS K 6833 may be 2.0 to 5.5. When the relative viscosity of the crystalline polyamide resin is 2.0 or more, the intermediate layer exhibits moderate mechanical strength. When the relative viscosity of the crystalline polyamide resin is 5.5 or less, the intermediate layer exhibits moderate formability. The relative viscosity of the crystalline polyamide resin may be 2.2 to 4.8, or may be 2.7 to 4.0.

The crystalline polyamide resin can be synthesized by a known polyamide production method using the above raw material. A commercially available product may be used as the crystalline polyamide resin.

Examples of a commercially available product of the crystalline polyamide resin include a polyamide 6-66 copolymer ("Novamid 2430J" manufactured by DSM Japan Engineering Plastics K.K.), polyamide 6 ("Akron F136" manufactured by DSM Japan Engineering Plastics K.K.), polyamide 66 ("A125" manufactured by Unitika Ltd.), polyamide 46 ("C2000" manufactured by Teijin Ltd.), polyamide 11 ("BMNO" manufactured by ARKEMA K.K.), polyamide 12 ("AMNO" manufactured by ARKEMA K.K.), and the like. In particular, transparency and flexibility can be obtained by utilizing a polyamide 6-66 copolymer.

1.2.1.1. Monomer and Low-Molecular-Weight Polymer

The crystalline polyamide resin has a combined content of a monomer and a low-molecular-weight polymer of 0.8 mass % or less.

In this invention, a monomer is a unit substance for generating a polymer. For example, epsilon-caprolactam, adipic acid, and hexamethylenediamine are monomers of a polycaproamide-polyhexamethylene adipamide copolymer (polyamide 6-66) which is a crystalline polyamide resin.

The term 'a low-molecular-weight polymer' is a generic term for low polymerization degree polymers with a degree of polymerization 2 and with a degree of polymerization higher order. The molecular weight of polymer with a degree of polymerization higher order is under 1,000 or 10,000.

The term "a combined content of a monomer and a low-molecular-weight polymer content" used herein refers to a value measured in accordance with JIS K 6810. Specifically, the total organic carbon is measured using an extract obtained by extraction with boiling purified water (6 hours) using a total organic carbon analyzer, and the low-molecular-weight polymer content is calculated from the total organic carbon on a caprolactam basis. Polyamide 6 or a polyamide 6-66 copolymer generally used for food and medical applications has a combined content of a monomer and a low-molecular-weight polymer of about 1.5 mass %. Since the crystalline polyamide resin used in one embodiment of the invention has a combined content of a monomer and a low-molecular-weight polymer of 0.8 mass % or less, elution of a monomer and a low-molecular-weight polymer into a solution contained in the bag rarely occurs. Moreover, since a proper quantity of the noncrystalline polyamide resin is mixed, it is possible to meet the standard of the Japanese Pharmacopoeia. In order to reliably reduce elution of a monomer and a low-molecular-weight polymer from the intermediate layer, the crystalline polyamide resin may have a combined content of a monomer and a low-molecular-weight polymer of 0.1 to 0.8 mass %, or may have a combined content of a monomer and a low-molecular-weight polymer of 0.1 to 0.7 mass %.

The combined content of a monomer and a low-molecular-weight polymer in the crystalline polyamide resin may be reduced by repeating an operation that immerses the resin in a pellet state in boiling purified water to extract a monomer and a low-molecular-weight polymer until the combined content of a monomer and a low-molecular-weight polymer decreases to the desired value.

1.2.2. Noncrystalline Polyamide Resin

The noncrystalline polyamide resin that may be used for the intermediate layer 14 includes a semi-aromatic polyamide. When the intermediate layer 14 includes a semi-aromatic polyamide, elution of a monomer and a low-molecular-weight polymer from the intermediate layer 14 rarely occurs. Specific examples of the noncrystalline polyamide resin include an isophthalic acid/terephthalic acid/hexamethylenediamine polycondensate, an isophthalic acid/terephthalic acid/hexamethylenediamine/bis(3-methyl-4-aminocyclohexyl)methane polycondensate, a terephthalic acid/2,2,4-trimethylhexamethylenediamine/2,4,4-trimethylhexamethylenediamine polycondensate, an isophthalic acid/bis(3-methyl-4-aminocyclohexyl)methane/omega-laurolactam polycondensate, an isophthalic acid/2,2,4-trimethylhexamethylenediamine/2,4,4-trimethylhexamethylenediamine polycondensate, an isophthalic acid/terephthalic acid/2,2,4-trimethylhexamethylenediamine/2,4,4-trimethylhexamethylenediamine polycondensate, an isophthalic acid/bis(3-methyl-4-aminocyclohexyl)methane/omega-laurolactam polycondensate, and the like. The benzene ring of the terephthalic acid component and/or the isophthalic acid component that forms these polycondensates may be substituted with an alkyl group or a halogen atom. These noncrystalline polyamide resins may be used in combination. For example, an isophthalic acid/terephthalic acid/hexamethylenediamine polycondensate, an isophthalic acid/terephthalic acid/hexamethylenediamine/bis(3-methyl-4-aminocyclohexyl)methane polycondensate, a terephthalic acid/2,2,4-trimethylhexamethylenediamine/2,4,4-trimethylhexamethylenediamine polycondensate, or a mixture of an isophthalic acid/terephthalic acid/hexamethylenediamine/bis(3-methyl-4-aminocyclohexyl)methane polycondensate and a terephthalic acid/2,2,4-trimethylhexamethylenediamine/2,4,4-trimethylhexamethylenediamine polycondensate may be used as the noncrystalline polyamide resin. In particular, the noncrystalline polyamide resin may be an isophthalic acid/terephthalic acid/hexamethylenediamine polycondensate.

The relative viscosity of the noncrystalline polyamide resin is not particularly limited. The relative viscosity of the noncrystalline polyamide resin measured using a 96 mass % concentrated sulfuric acid as a solvent at a temperature of 25° C. and a concentration of 1 g/dl in accordance with JIS K 6833 may be 1.0 to 3.5 or 1.3 to 2.8. When the relative viscosity of the noncrystalline polyamide resin is 1.0 or more, the noncrystalline polyamide resin exhibits moderate viscosity, and the take-up capability after polymerization or melt-mixing tends to be improved. When the relative viscosity of the noncrystalline polyamide resin is 3.5 or less, moderate fluidity is obtained during forming.

The noncrystalline polyamide resin can be synthesized by a known polyamide production method using the above raw material. A commercially available product may be used as the noncrystalline polyamide resin. Examples of a commercially available product of the noncrystalline polyamide resin include the X21 series manufactured by DSM Japan Engineering Plastics K.K., and the like.

1.2.3. Additional Component

A small amount of silica, talc, kaolin, and the like may be added to the polyamide resin used for food and medical applications other than injection bag applications in order to improve formability and the like as long as the object of the invention is not impaired. A small amount of various resin additives (e.g., pigment, dye, thermal stabilizer, and antistatic agent) that have been generally used may be added to the polyamide resin as long as the object of the invention is not impaired.

1.3. Adhesive Layer

An adhesive that forms the adhesive layers 12 and 16 according to one embodiment of the invention is not particularly limited as long as the adhesive can reliably bond the polyamide resin included in the intermediate layer 14 and a layer (e.g., innermost layer 10 or outermost layer 18) situated on the outer side of the adhesive layer 12 or 16. A resin used for an injection bag may be appropriately used as the adhesive. For example, a modified polyolefin resin or a compound resin thereof may be used as the adhesive.

1.3.1. Modified Polyolefin Resin

The term "modified polyolefin resin" used herein refers to a polyolefin resin that is modified with an alpha,beta-unsaturated carboxylic acid. Specific examples of the modified polyolefin resin include a copolymer (a) of an olefin that includes ethylene, propylene, isobutylene, and styrene as the main components, and an alpha,beta-unsaturated carboxylic acid or a derivative thereof, a graft polymer (b) obtained by grafting an alpha,beta-unsaturated carboxylic acid or a derivative thereof onto a polymer of an olefin that includes ethylene, propylene, and styrene as the main components, and the like.

Examples of the alpha,beta-unsaturated carboxylic acid or a derivative thereof used for the copolymer (a) include acrylic acid, methacrylic acid, methyl methacrylate, sodium acrylate, zinc acrylate, vinyl acetate, glycidyl methacrylate, and the like. Specific examples of the copolymer (a) include an ethylene-vinyl acetate copolymer, an ethylene-acrylic acid copolymer, an ethylene-ethyl acrylate copolymer, an ethylene-sodium acrylate copolymer, and the like.

Examples of the polymer of an olefin used as the graft base of the graft polymer (b) include polyethylene, polypropylene, an ethylene-propylene copolymer, an ethylene-butene-1 copolymer, an ethylene-vinyl acetate copolymer, an ethylene-acrylic acid copolymer, an ethylene-ethyl acrylate copolymer, an ethylene-sodium acrylate copolymer, a styrene-isoprene copolymer, a styrene-isobutylene copolymer, and the like.

Examples of the alpha,beta-unsaturated carboxylic acid or a derivative thereof that is grafted onto the polymer of an olefin include acrylic acid, methacrylic acid, ethacrylic acid, maleic acid, fumaric acid, acid anhydrides thereof, esters of these acids and tetrahydrofurfuryl alcohol or the like, and the like.

The modified polyolefin resins that include propylene as the main component may have an MFR of 1 to 20 g/10 mm, for example. When the MFR is equal to or less than the above upper limit, moderate film strength tends to be obtained, and the film-forming capability tends to be stabilized. When the MFR is equal to or more than the above lower limit, extrudability tends to be relatively stabilized.

The modified polyolefin resin can be synthesized by a known modified polyolefin production method using the above raw material. A commercially available product may be used as the modified polyolefin resin. Examples of a commercially available product of the modified polyolefin resin include MC721AP and MC756AP manufactured by Mitsubishi Chemical Corporation, and the like.

1.3.2. Additional Component

An unmodified polyolefin resin or an unmodified thermoplastic elastomer, or both, may be mixed into the modified polyolefin resin in a total amount of 0 to 95 mass %. When the content of the unmodified polyolefin resin or the unmodified thermoplastic elastomer, or both, is 95 mass % or less, moderate adhesion can be obtained. Various resin additives (e.g., pigment, dye, thermal stabilizer, and antistatic agent) that have been generally used may be added to the modified polyolefin resin as long as the object of the invention is not impaired.

2. Method for Producing Multilayer Film

The multilayer film used to produce the injection bag according to one embodiment of the invention may be produced by a circular die method. A tube-like multilayer formed using a circular die may be subjected to biaxial stretching using a tubular stretching method that can implement simultaneous stretching in the lengthwise direction and the breadthwise direction. Examples of the circular die method include a water-cooling inflation method that cools a material with water, an air-cooling inflation method that continuously extrudes a material from a circular die, and cools the material with air, and the like. In particular, the water-cooling inflation method that ensures excellent transparency and flexibility may be used.

2.1. Configuration of Multilayer Film

Configuration examples of the multilayer film used to produce the injection bag according to one embodiment of the invention are described below. The following configuration examples of the multilayer film illustrate a configuration from the innermost layer to the outermost layer. PP refers to a polypropylene-based resin, and PA refers to a polyamide resin mixture (i.e., a mixture of crystalline polyamide resin and noncrystalline polyamide resin). PP(1) and PP(2) are different polypropylene-based resins provided that the flexural modulus of the polypropylene-based resin PP(1) is higher than that of the polypropylene-based resin PP(2). PA(1) and PA(2) are different polyamide resin mixtures.

PP/adhesive layer/PA/adhesive layer/PP, PP/adhesive layer/PA(1)/PA(2)/adhesive layer/PP, PP(1)/PP(2)/adhesive layer/PA/adhesive layer/PP(2)/PP(1), PP(1)/PP(2)/adhesive layer/PA(1)/PA(2)/adhesive layer/PP(2)/PP(1), PP/adhesive layer/PA/adhesive layer/PA/adhesive layer/PP, PP/adhesive layer/PA(1)/adhesive layer/PA(2)/adhesive layer/PP, PP(1)/PP(2)/adhesive layer/PA/adhesive layer/PA/adhesive layer/PP(2)/PP(1), PP(1)/PP(2)/adhesive layer/PA(1)/adhesive layer/PA(2)/adhesive layer/PP(2)/PP(1)

2.1.1. Thickness of Multilayer Film

The thickness of the multilayer film may be appropriately selected from a range applied to an injection bag. The thickness of the multilayer film may be 80 to 300 micrometers. When the thickness of the multilayer film is 80 micrometers or more, moderate massive quality can be obtained. When the thickness of the multilayer film is 300 micrometers or less, moderate flexibility can be obtained. In particular, the thickness of the multilayer film may be 100 to 300 micrometers. When the thickness of the multilayer film is 100 micrometers or more, moderate thrust strength can be obtained.

The thickness of the innermost layer (polypropylene-based resin layer) of the multilayer film may be 10 to 100 micrometers. When the thickness of the innermost layer is 10 micrometers or more, moderate seal stability can be obtained. When the thickness of the innermost layer is 100 micrometers or less, moderate flexibility and transparency can be obtained. When the multilayer film has a five-layer structure consisting of PP/adhesive layer/PA/adhesive layer/PP, the thickness of the innermost layer may be 15 to 60 micrometers. If the thickness of the innermost layer exceeds 60 micrometers, fall strength may deteriorate. If the thickness of the innermost layer is 15 micrometers or less, it may be difficult to stably produce the innermost layer.

The thickness of the intermediate layer (polyamide resin mixture layer) of the multilayer film may be 15 to 45 micrometers. When the thickness of the intermediate layer is 15 micrometers or more, moderate mechanical strength, oxygen barrier capability, and the like can be obtained. If the thickness of the intermediate layer exceeds 45 micrometers, the total amount of monomer and low-molecular-weight polymer included in the intermediate layer 14 may increase, and the maximum UV absorbance may increase when subjecting the multilayer film to the Test Methods for Plastic Containers specified in the Japanese Pharmacopoeia 16th Edition. When the multilayer film has a five-layer structure consisting of PP/adhesive layer/PA/adhesive layer/PP, the thickness of the intermediate layer may be 20 to 42 micrometers or 23 to 37 micrometers. When the thickness of the intermediate layer is 20 micrometers or more, the multilayer film exhibits low carbon dioxide permeability, and volatilization of bicarbonate ions during heat sterilization at a temperature of more than 100° C. can be suppressed. When the thickness of the intermediate layer is 23 micrometers or more, volatilization of bicarbonate ions during heat sterilization in an injection preparation assembly even at 121° C. can be suppressed, and the pH can be adjusted within the intracorporal injection allowable range. When the thickness of the intermediate layer is 42 micrometers or less, the multilayer film exhibits moderate flexibility When the thickness of the intermediate layer is 37 micrometers or less, the edge of the injection bag in which a drug solution is contained according to one embodiment of the invention exhibits flexibility (i.e., it is comfortable for the user).

The thickness of the adhesive layer of the multilayer film may be 10 to 100 micrometers. When the thickness of the adhesive layer is 10 micrometers or more, the adhesive layer exhibits adhesion. When the thickness of the adhesive layer is 100 micrometers or less, moderate flexibility and transparency can be obtained. When the multilayer film has a five-layer structure consisting of PP/adhesive layer/PA/adhesive layer/PP, the thickness of the adhesive layer may be 15 to 60 micrometers.

The thickness of the outermost layer (polypropylene-based resin layer) of the multilayer film may be 10 to 100 micrometers. When the thickness of the outermost layer is 10 micrometers or more, moderate heat resistance can be obtained. When the thickness of the outermost layer is 100 micrometers or less, moderate flexibility and transparency can be obtained. When the multilayer film has a five-layer structure consisting of PP/adhesive layer/PA/adhesive layer/PP, the thickness of the outermost layer may be 15 to 60 micrometers. When the thickness of the outermost layer is 60 micrometers or less, the desired fall strength can be obtained. When the thickness of the outermost layer is 15 micrometers or more, it is possible to stably produce the outermost layer.

The thickness of the part of the multilayer situated on the inner side of the intermediate layer may be 70 micrometers or more. When thickness of the part of the multilayer situated on the inner side of the intermediate layer is 70 micrometers or more, a low maximum UV absorbance is obtained when subjecting the multilayer film to the Test Methods for Plastic Containers specified in the Japanese Pharmacopoeia 16th Edition.

3. Bag Production Method and Applications

The injection bag according to one embodiment of the invention may be produced using the multilayer film by utilizing a known method that produces a bag using a film. The injection bag according to one embodiment of the invention that is formed of the multilayer film is a bag that holds an injection. Examples of the injection include an infusion, an artificial kidney dialysis fluid, a peritoneal dialysis fluid, blood, and the like. The injection bag may also suitably be used as a medical container for injecting, discharging, or storing a body fluid, a drug solution, and the like. The bag may be a multi-chamber container (e.g., double bag) structure, a single-chamber container (single bag) structure, or the like depending on the application.

The injection bag according to one embodiment of the invention that is formed of the multilayer film has a maximum UV absorbance measured in accordance with the Japanese Pharmacopoeia 16th Edition of 0.01 to 0.08 although a polyamide resin is used for the intermediate layer. Therefore, the injection bag according to one embodiment of the invention meets the maximum UV absorbance standard of the Test Methods for Plastic Containers specified in the Japanese Pharmacopoeia 16th Edition.

Since the injection bag according to one embodiment of the invention that is formed of the multilayer film exhibits an excellent gas barrier capability, the injection bag can reduce the possibility that a drug solution changes in quality, and can reduce a change in drainage capability and the like due to a differential pressure (osmotic pressure). Since the injection bag according to one embodiment of the invention that is formed of the multilayer film exhibits an excellent gas barrier capability, it is possible to use bicarbonate ions for adjusting the pH of an injection or a peritoneal dialysis fluid.

4. Examples and Comparative Examples

The invention is further described in detail below by way of examples. Note that the invention is not limited to the following examples.

4.1. Raw Material

The materials shown in Tables 1 and 2 were used as the raw materials in the examples and comparative examples.

PP(A) to PP(E) used for the innermost layer and the outermost layer are polypropylene-based resins manufactured by Mitsubishi Chemical Corporation. The grade, the MFR (g/10 min) (measured in accordance with JIS K 6758), and the melting peak temperature (measured in accordance with JIS K 7121) of each polypropylene-based resin are shown in Table 1.

AP(A) and AP(B) used for the adhesive layer are modified polyolefin resins (ethylene-propylene copolymer) manufactured by Mitsubishi Chemical Corporation (a mixture with a styrene-based elastomer). The grade, the MFR (g/10 min) (measured in accordance with JIS K 6758), and the melting peak temperature (measured in accordance with JIS K 7121) of each modified polyolefin resin are shown in Table 1.

TABLE 1

|  |  | Grade | MFR | Melting peak (° C.) |
|---|---|---|---|---|
| Innermost layer and | PP(A) | ZELAS 7023 | 2.0 | 165 |
| outermost layer | PP(B) | ZELAS 7025 | 1.6 | 162 |
|  | PP(C) | MC752 | 3.3 | 163 |
|  | PP(D) | MC723 | 1.8 | 162 |
|  | PP(E) | MC753 | 3.5 | 161 |
|  | PP(F) | MC704 | 1.8 | 162 |
| Adhesive layer | AP(A) | MC721AP | 3.1 | 158 |
|  | AP(B) | MC756 | 2.1 | 161 |

PA(A) to PA(C) used for the intermediate layer are mixtures of Novamid 2430J (crystalline polyamide resin manufactured by DSM Japan Engineering Plastics K.K.) and Novamid X21-F07 (noncrystalline polyamide resin manufactured by DSM Japan Engineering Plastics K.K.) (see Table 2). Three types of Novamid 2430J differing in low-molecular-weight polymer content (1.49 mass %, 0.77 mass %, or 0.67 mass %) were used. For example, PA(A10) (see Table 2) is a mixture of 90 mass % of Novamid 2430J having a low-molecular-weight polymer content of 1.49 mass % and 10 mass % of Novamid X21-F07. Note that Novamid 2430J having a low-molecular-weight polymer content of 0.8 mass % was used as PA(B00). The low-molecular-weight polymer content in Novamid 2430J was measured in accordance with JIS K 6810.

TABLE 2

| | | Novamid 2430J (mass %) Low-molecular-weight polymer content (mass %) | | | Novamid X21-F07 |
|---|---|---|---|---|---|
| | | 1.49 | 0.77 | 0.67 | (mass %) |
| Intermediate layer | PA(A10) | 90 | | | 10 |
| | PA(A30) | 70 | | | 30 |
| | PA(A50) | 50 | | | 50 |
| | PA(B00) | | 100 | | 0 |
| | PA(B10) | | 90 | | 10 |
| | PA(B30) | | 70 | | 30 |
| | PA(B35) | | 65 | | 35 |
| | PA(B40) | | 60 | | 40 |
| | PA(C20) | | | 80 | 20 |
| | PA(C30) | | | 70 | 30 |
| | PA(C35) | | | 65 | 35 |

4.2. Multilayer Film Production Method

A film consisting of each combination of the raw material resins shown in Tables 3 to 5 was produced using a water-cooling inflation forming machine (5-type/5-layer configuration) provided with a multilayer film production die at the end. The thickness of each layer (innermost layer/inner adhesive layer/intermediate layer/outer adhesive layer/outermost layer) was set as shown in Tables 3 and 4 (40 micrometers/45 micrometers/30 micrometers/45 micrometers/40 micrometers), or set as shown in Table 5.

TABLE 3

| | Innermost layer 40 micrometers | Inner adhesive layer 45 micrometers | Intermediate layer 30 micrometers | Outer adhesive layer 45 micrometers | Outermost layer 40 micrometers |
|---|---|---|---|---|---|
| Example 1 | PP(A) | AP(A) | PA(B10) | AP(A) | PP(D) |
| Example 2 | PP(A) | AP(A) | PA(B30) | AP(A) | PP(D) |
| Example 3 | PP(A) | AP(A) | PA(B35) | AP(A) | PP(D) |
| Example 4 | PP(A) | AP(A) | PA(B40) | AP(A) | PP(D) |
| Example 5 | PP(A) | AP(A) | PA(C20) | AP(A) | PP(D) |
| Example 6 | PP(A) | AP(A) | PA(C30) | AP(A) | PP(D) |
| Example 7 | PP(A) | AP(A) | PA(C35) | AP(A) | PP(D) |
| Example 8 | PP(B) | AP(A) | PA(B30) | AP(A) | PP(E) |
| Example 9 | PP(B) | AP(B) | PA(B30) | AP(B) | PP(E) |
| Example 10 | PP(C) | AP(B) | PA(B30) | AP(B) | PP(E) |

TABLE 4

| | Innermost layer 40 micrometers | Inner adhesive layer 45 micrometers | Intermediate layer 30 micrometers | Outer adhesive layer 45 micrometers | Outermost layer 40 micrometers |
|---|---|---|---|---|---|
| Comparative Example 1 | PP(A) | AP(A) | PA(A10) | AP(A) | PP(D) |
| Comparative Example 2 | PP(A) | AP(A) | PA(A30) | AP(A) | PP(D) |
| Comparative Example 3 | PP(A) | AP(A) | PA(A50) | AP(A) | PP(D) |
| Comparative Example 4 | PP(A) | AP(A) | PA(B00) | AP(A) | PP(D) |
| Comparative Example 5 | PP(A) | | PP(F) | | PP(D) |

TABLE 5

| | Thickness of innermost layer (micrometers) | Thickness of inner adhesive layer (micrometers) | Thickness of intermediate layer (micrometers) | Thickness of outer adhesive layer (micrometers) | Thickness of outermost layer (micrometers) |
|---|---|---|---|---|---|
| Example 11 | PP(C) 40 | AP(A) 45 | PA(B30) 23 | AP(A) 52 | PP(E) 40 |
| Example 12 | PP(C) 40 | AP(A) 45 | PA(B30) 37 | AP(A) 38 | PP(E) 40 |
| Example 13 | PP(D) 40 | AP(A) 45 | PA(B35) 38 | AP(A) 37 | PP(A) 40 |
| Example 14 | PP(D) 40 | AP(A) 45 | PA(B40) 45 | AP(A) 30 | PP(A) 40 |
| Example 15 | PP(A) 40 | AP(A) 30 | PA(B40) 45 | AP(A) 45 | PP(D) 40 |
| Comparative Example 6 | PP(A) 55 | AP(A) 55 | PA(A30) 30 | AP(A) 55 | PP(D) 50 |
| Comparative Example 7 | PP(A) 75 | AP(A) 55 | PA(A30) 30 | AP(A) 55 | PP(D) 50 |

4.3. Evaluation Method

The multilayer film obtained as described above (see Section 4.2), and a bag produced using each multilayer film were evaluated using the following methods. The evaluation results are shown in Tables 7 and 8 and FIGS. 2, 3, and 4.

4.3.1. Film-Forming Capability

A case where a film-forming failure did not occur during water-cooling inflation forming (see Section 4.2) was evaluated as "A", and a case where a film-forming failure occurred during water-cooling inflation forming (see Section 4.2) was evaluated as "B" (see "Film-forming capability" Tables 7 and 8).

4.3.2. Haze (%)

Six specimens were sampled from each multilayer film obtained as described above (see Section 4.2), and subjected to measurement in accordance with JIS K 7105. A case where the haze value was 12 or less (i.e., a case where excellent transparency was obtained) was evaluated as "A", and a case where the haze value was more than 12 (i.e., a case where the transparency was poor) was evaluated as "B" (see "Haze" in Tables 7 and 8).

4.3.3. Heat Resistance

A tube-like (cylindrical) (stacked) multilayer formed by water-cooling inflation forming (see Section 4.2) was cut to dimensions of 210×210 mm, and heat-sealed on three sides to form a bag. The bag was charged with 700 ml of purified water (Millipore Milli-Q), and the remaining side was heat-sealed. A sample bag thus obtained was placed in a high-temperature/high-pressure cooking pasteurization tester ("RCS-40RTG" manufactured by Hisaka Works Ltd.), and pressurized. After increasing the atmospheric temperature to 121° C., the temperature was maintained at 121° C. for 60 minutes, and lowered to 25° C. The sample bag was removed from the tester, and allowed to stand at 5° C. for 24 hours. A case where the sample bag did not wrinkle, or a deterioration in transparency did not occur, was evaluated as "A", and a case where the sample bag wrinkled, or a deterioration in transparency occurred, was evaluated as "B" (see "Heat resistance" in Tables 7 and 8).

4.3.4. Strength

The sample bag sterilized at 121° C. for 60 minutes (see Section 4.3.3) was allowed to stand at 5° C. for 24 hours, and dropped three times from a height of 1.6 m (parallel falling). A case where the sample bag did not break was evaluated as "A", and a case where the sample bag broke was evaluated as "B" (see "Strength" in Tables 7 and 8).

4.3.5. Maximum UV Absorbance

Figure 2:
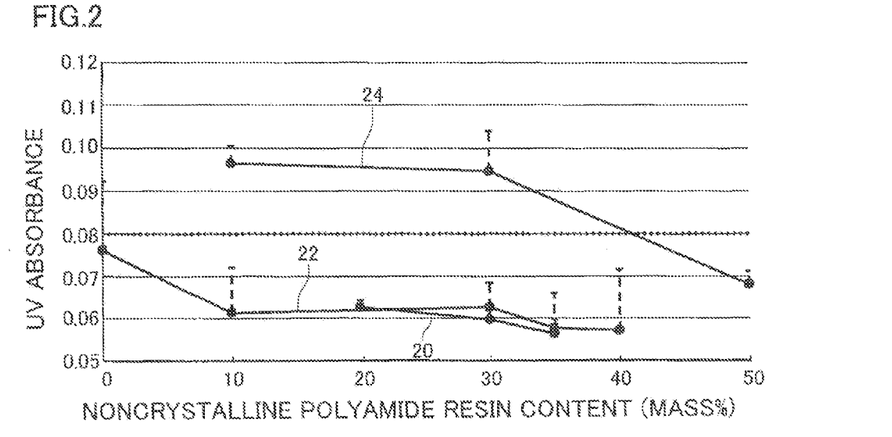
FIG. 2 is a graph illustrating the relationship between the noncrystalline polyamide resin content (ratio) in the intermediate layer and the UV absorbance in Examples 1 to 6 and Comparative Examples 1, 2, 5, and 6.

A tube-like (cylindrical) (stacked) multilayer formed by water-cooling inflation forming (see Section 4.2) was cut to dimensions of 150×100 mm, and heat-sealed on three sides to form a bag. The bag was charged with 100 ml of purified water, and the remaining side was heat-sealed. The resulting sample bag was immersed in purified water in accordance with the Test Methods for Plastic Containers specified in the Japanese Pharmacopoeia 16th Edition in the same manner as in Section 4.3.3, and the maximum UV absorbance was measured. Specifically, a test solution was prepared in accordance with the Test Methods for Plastic Containers (elution test) specified in the Japanese Pharmacopoeia 16th Edition, and the maximum UV absorbance at 220 to 240 nm was measured using a UV spectrophotometer "UV-2450" (manufactured by Shimadzu Corporation). The results are shown in Tables 7 and 8. The Japanese Pharmacopoeia requires that the above value be 0.08 or less. A case where the average maximum UV absorbance of the sample bags was 0.08 or less was evaluated as "A", and a case where the average maximum UV absorbance of the sample bags was more than 0.08 was evaluated as "B" (see "Absorbance" in Tables 7 and 8). FIG. 2 (line chart) shows the average maximum UV absorbance (see the solid lines) relative to the low-molecular-weight polymer content in the crystalline polyamide resin used for the intermediate layer. The dotted line indicates the standard deviation of the maximum UV absorbance (3sigma). In FIG. 2, the horizontal axis indicates the ratio (content) (mass %) of the noncrystalline polyamide resin used for the intermediate layer, and the vertical axis indicates the maximum UV absorbance of the sample bag. Reference sign 20 indicates the results obtained in Examples 5 to 7, reference sign 22 indicates the results obtained in Comparative Example 4 and Examples 1 to 4, and reference sign 24 indicates the results obtained in Comparative Examples 1 to 3.

4.3.6. $CO_2$ Permeability

Figure 3:
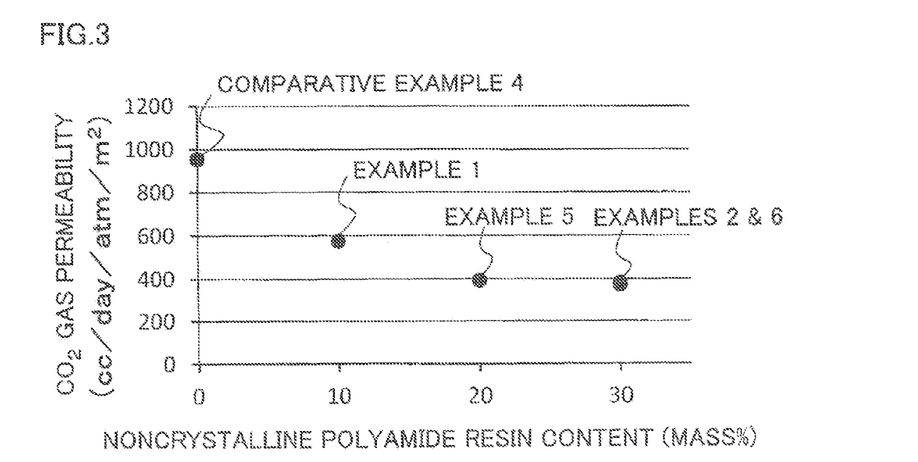
FIG. 3 is a graph illustrating the relationship between the noncrystalline polyamide resin content in the intermediate layer of the multilayer film and the carbon dioxide permeability at a temperature of 40° C. and a relative humidity of 80% in Examples 1, 2, and 5 and Comparative Example 6.

Three specimens were sampled from each multilayer film obtained as described above (see Section 4.2). The $CO_2$ gas permeability (cc/day/atm/m$^2$) was measured at an atmospheric temperature of 40° C. and a relative humidity of 80% using a differential-pressure gas permeability measurement device ("GTR-10XACT" manufactured by GTR Tec Corporation). A case where the permeability was less than 400 cc/day/atm/m$^2$ was evaluated as "A", a case where the permeability was 400 or more and less than 800 cc/day/atm/m$^2$ was evaluated as "B", a case where the permeability was 800 or more and less than 1200 cc/day/atm/m$^2$ was evaluated as "C", and a case where the permeability was 1200 or more cc/day/atm/m$^2$ was evaluated as "D". A small $CO_2$ gas permeability value indicates a high $CO_2$ gas barrier capability. FIG. 3 shows the $CO_2$ gas permeability measurement results. In FIG. 3, the horizontal axis indicates the ratio (content) (mass %) of the noncrystalline polyamide resin used for the intermediate layer, and the vertical axis indicates the $CO_2$ gas permeability (cc/day/atm/m$^2$). In Example 5 and 6, the low-molecular-weight polymer content in the crystalline polyamide resin used for the intermediate layer was 0.67 mass %. In Comparative Example 4 and Examples 1 and 2, the low-molecular-weight polymer content in the crystalline polyamide resin used for the intermediate layer was 0.77 mass %.

4.3.7. Change in pH

Figure 4:
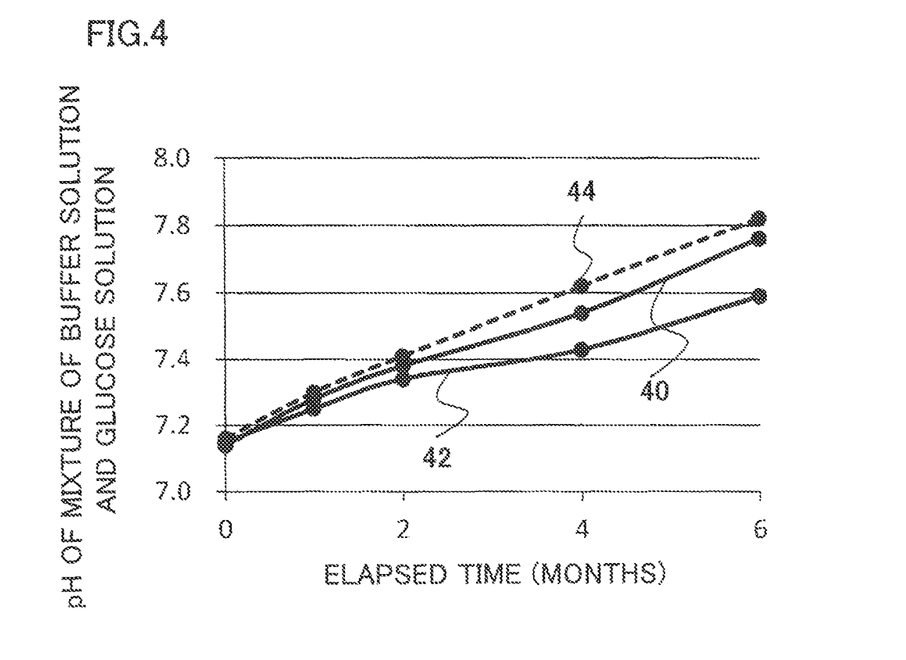
FIG. 4 is a graph illustrating a change in pH of a mixture of a buffer solution and a glucose solution in the test bags relative to the elapsed time in Examples 1 and 2 and Comparative Example 4.

A tube-like (cylindrical) (stacked) multilayer (width: 18 cm) formed by water-cooling inflation forming (see Section 4.2) was heat-sealed to have an inner dimension of 28 cm to obtain a plurality of test bags having a chamber A charged with 637 ml of a buffer solution (see Table 7), and a chamber B that was heat-sealed to have an inner dimension of 18 cm, charged with 363 ml of a glucose solution (see Table 7), and divided from the chamber A by a weak seal. Each test bag was sterilized at 121° C. for 40 minutes, and allowed to stand at a temperature of 40° C. and a relative humidity of 80%. After the passage of a specific period (immediately after sterilization, after 1 month, after 2 months, after 4 months, or after 6 months), the weak seal was opened, and the pH of a mixture of the buffer solution and the glucose solution was measured. The results are shown in FIG. 4. In FIG. 4, reference sign 40 indicates the results obtained in Example 1, reference sign 42 indicates the results obtained in Example 2, and reference sign 44 indicates the results obtained in Comparative Example 4.

TABLE 6

| | |
|---|---|
| Buffer solution | 637 ml in total (w/v %) |
| Sodium bicarbonate | 3.62 |
| Sodium chloride | 4.94 |
| Sodium hydroxide | 0.176 |
| Glucose solution | 363 ml in total (w/v %) |
| Anhydrous glucose | 62.6 |
| Sodium chloride | 0.610 |
| Anhydrous calcium chloride | 0.071 |
| Magnesium hexahydrate | 0.014 |
| Sodium lactate | 0.309 |
| Hydrochloric acid | 0.145 |

4.4. Evaluation Results

The evaluation results obtained in each example and comparative example are shown in Tables 7 and 8 and FIGS. 2 to 4.

TABLE 7

| | Film-forming capability | Haze | Heat resistance | Strength | Absorbance Abs | Evaluation | $CO_2$ permeability |
|---|---|---|---|---|---|---|---|
| Example 1 | A | A | A | A | 0.061 | A | B |
| Example 2 | A | A | A | A | 0.063 | A | A |
| Example 3 | A | A | A | A | 0.058 | A | A |
| Example 4 | A | A | A | A | 0.057 | A | A |
| Example 5 | A | A | A | A | 0.063 | A | A |
| Example 6 | A | A | A | A | 0.060 | A | A |
| Example 7 | A | A | A | A | 0.056 | A | A |
| Example 8 | A | A | A | A | 0.062 | A | A |
| Example 9 | A | A | A | A | 0.066 | A | A |
| Example 10 | A | A | A | A | 0.065 | A | A |
| Example 11 | A | A | A | A | 0.054 | A | A |
| Example 12 | A | A | A | A | 0.071 | A | A |
| Example 13 | A | A | A | A | 0.065 | A | A |

TABLE 7-continued

|  | Film-forming capability | Haze | Heat resistance | Strength | Absorbance | | $CO_2$ permeability |
|---|---|---|---|---|---|---|---|
|  |  |  |  |  | Abs | Evaluation |  |
| Example 14 | A | A | A | A | 0.073 | A | A |
| Example 15 | A | A | A | A | 0.075 | A | A |

TABLE 8

|  | Film-forming capability | Haze | Heat resistance | Strength | Absorbance | | $CO_2$ permeability |
|---|---|---|---|---|---|---|---|
|  |  |  |  |  | Abs | Evaluation |  |
| Comparative Example 1 | A | A | A | A | 0.10 | B | A |
| Comparative Example 2 | A | A | A | A | 0.09 | B | A |
| Comparative Example 3 | B | B | A | — | 0.07 | A | — |
| Comparative Example 4 | A | A | A | A | 0.08 | B | C |
| Comparative Example 5 | A | A | A | A | 0.01 | A | D |
| Comparative Example 6 | A | A | A | A | 0.10 | B | A |
| Comparative Example 7 | A | A | A | A | 0.09 | B | A |

The following were confirmed by the results shown in Tables 7 and 8 and FIGS. 2 to 4.

The sample bags respectively formed of the multilayer films of Examples 1 to 15 met the maximum UV absorbance standard (0.08 or less) of the Test Methods for Plastic Containers specified in the Japanese Pharmacopoeia 16th Edition although a polyamide resin was used for the intermediate layer of the multilayer film. The maximum UV absorbance of the sample bag of Examples 1 to 7 was less than the standard deviation (3sigma) (see FIG. 2). The multilayer films of Examples 1 to 15 had an excellent film-forming capability, and exhibited excellent heat resistance, haze value, and fall strength. In particular, the multilayer films of Examples 2 to 15 had a $CO_2$ permeability measured at a temperature of 40° C. and a relative humidity of 80% of 400 cc/day/atm/m² or less. When the $CO_2$ permeability measured at a temperature of 40° C. and a relative humidity of 80% was 400 cc/day/atm/m² or less, a change in pH could be suppressed to 0.3 or less when sterilization was performed at 121° C. in a state in which the bag was charged with a drug solution including bicarbonate ions in an amount of 27 mEq/l or more, followed by storage at a temperature of 40° C. and a relative humidity of 80% for 6 months.

In contrast, the sample bags of Comparative Examples 1 and 2 formed of the multilayer film in which the crystalline polyamide resin having a low-molecular-weight polymer content of 1.5 mass % was used for the intermediate layer in an amount of 70 to 90 mass %, did not meet the maximum UV absorbance standard. The sample bag of Comparative Example 4 formed of the multilayer film in which the crystalline polyamide resin having a low-molecular-weight polymer content of 1.5 mass % was used for the intermediate layer, but the noncrystalline polyamide resin was used in an amount of 50 mass %, met the maximum UV absorbance standard, but a film-forming failure occurred. The sample bags of Comparative Examples 6 and 7 formed of the multilayer film in which the low-molecular-weight polymer content in the intermediate layer was 1.5 mass %, and the thickness of the innermost layer and the adhesive layer situated on the inner side of the intermediate layer was increased, did not meet the maximum UV absorbance standard. When using the multilayer film of Comparative Example 4, the $CO_2$ permeability measured at a temperature of 40° C. and a relative humidity of 80% exceeded 800 cc/day/atm/m² or less, and a change in pH exceeded 0.45 when sterilization was performed at 121° C. in a state in which the bag was charged with a drug solution including bicarbonate ions in an amount of 27 mEq/l or more, followed by storage at a temperature of 40° C. and a relative humidity of 80% for 6 months.

INDUSTRIAL APPLICABILITY

The injection bag according to the embodiments of the invention that is formed of a multilayer film meets the maximum UV absorbance standard (0.08 or less) of the Test Methods for Plastic Containers specified in the Japanese Pharmacopoeia 16th Edition although a polyamide resin is used for the intermediate layer, and may be used for medical applications. Moreover, the injection bag according to the embodiments of the invention that is formed of a multilayer film can suppress a change in pH due to permeation of carbonic acid even when bicarbonate ions are used for a drug solution contained therein.

REFERENCE SIGNS LIST

10 Innermost layer
12 Adhesive layer
14 Intermediate layer
16 Adhesive layer
18 Outermost layer
20 Results obtained in Examples 5 to 7 in which PA(C) was used for intermediate layer 22 Results obtained in Examples 1 to 4 and Comparative Example 4 in which PA(B) was used for intermediate layer
24 Results obtained in Comparative Examples 1 to 3 in which PA(A) was used for intermediate layer
40 Results obtained in Example 1
42 Results obtained in Example 2
44 Results obtained in Comparative Example 2
F Multilayer film

The invention claimed is:

1. An injection bag that is formed of a multilayer film, the injection bag comprising:
   an innermost layer that is formed of a polypropylene-based resin;
   an outermost layer that is formed of a polypropylene-based resin;
   an intermediate layer that is situated between the innermost layer and the outermost layer; and
   two adhesive layers that are situated on either side of the intermediate layer,
   the intermediate layer including a mixture of 60 to 90 mass % of a crystalline polyamide resin and 10 to 40 mass % of a noncrystalline polyamide resin,
   the crystalline polyamide resin having a combined content of a monomer and a low-molecular-weight polymer of 0.8 mass % or less,
   the noncrystalline polyamide resin including a semi-aromatic polyamide, and
   the injection bag having a maximum UV absorbance measured in accordance with the Test Methods for Plastic Containers specified in the Japanese Pharmacopoeia 16th Edition of 0.08 or less.

2. The injection bag according to claim 1, wherein the polypropylene-based resin of at least one of the outermost layer and the innermost layer contains a polyolefin-based resin other than the polypropylene-based resin.

3. The injection bag according to claim 1 or 2, wherein the polypropylene-based resin has a flexural modulus of 300 to 700 MPa.

4. The injection bag according to claim 1 or 2, wherein the polypropylene-based resin contains a polyolefin-based elastomer.

5. The injection bag according to claim 1 or 2, wherein the intermediate layer has a thickness of 20 to 42 micrometers.

6. The injection bag according to claim 1 or 2, wherein the crystalline polyamide resin is a polyamide 6-66 copolymer.

7. The injection bag according to claim 1 or 2, wherein the noncrystalline polyamide resin is an isophthalic acid/terephthalic acid/hexamethylenediamine polycondensate.

8. The injection bag according to claim 1 or 2, wherein part of the multilayer film on the inner side of the intermediate layer has a thickness of 70 micrometers or more.

9. An injection preparation assembly comprising the injection bag according to claim 1 or 2, and a drug solution that is contained in the injection bag.

10. The injection preparation assembly according to claim 9, wherein the injection bag is a multi-chamber container structure.

11. The injection preparation assembly according to claim 10, wherein the drug solution contains bicarbonate ions.

12. The injection preparation assembly according to claim 11, wherein the drug solution includes bicarbonate ions in an amount of 27 mEq/l or more.

13. The injection preparation assembly according to claim 9, wherein the drug solution includes bicarbonate ions.

14. The injection preparation assembly according to claim 13, wherein the drug solution includes bicarbonate ions in an amount of 27 mEq/l or more.

15. The injection preparation assembly according to claim 9, wherein the polypropylene-based resin has a flexural modulus of 300 to 700 MPa.

16. The injection preparation assembly according to claim 9, wherein the polypropylene-based resin contains a polyolefin-based elastomer.

17. The injection preparation assembly according to claim 9, wherein the intermediate layer has a thickness of 20 to 42 micrometers.

18. The injection preparation assembly according to claim 9, wherein the crystalline polyamide resin is a polyamide 6-66 copolymer.

19. The injection preparation assembly according to claim 9, wherein the noncrystalline polyamide resin is an isophthalic acid/terephthalic acid/hexamethylenediamine polycondensate.

20. The injection preparation assembly according to claim 9, wherein part of the multilayer film on the inner side of the intermediate layer has a thickness of 70 micrometers or more.

* * * * *